United States Patent [19]

Stuehler

[11] 4,387,442
[45] Jun. 7, 1983

[54] CONTROLLED MACHINE INHIBITION WHEN CONTROL MODULE IS ABSENT

[75] Inventor: James E. Stuehler, Boulder, Colo.

[73] Assignee: International Business Machines Corporation, Armonk, N.Y.

[21] Appl. No.: 192,751

[22] Filed: Oct. 1, 1980

[51] Int. Cl.³ ............................................. G06F 15/46
[52] U.S. Cl. ................................................... 364/900
[58] Field of Search ........................ 364/900 MS File

[56] References Cited

U.S. PATENT DOCUMENTS

| | | | |
|---|---|---|---|
| 3,978,454 | 8/1976 | Willard | 364/900 |
| 4,030,080 | 6/1977 | Burkett et al. | 364/900 |
| 4,200,916 | 4/1980 | Seipp | 364/900 |
| 4,213,190 | 7/1980 | Finlay et al. | 364/900 |

OTHER PUBLICATIONS

Patent Application Ser. No. 89,799, filed 10/31/79.
Patent Application Ser. No. 192,118, filed 9/29/80.
IBM Technical Disclosure Bulletin, vol. 22, No. 10, Mar. 1980, pp. 4366-4368.

*Primary Examiner*—Raulfe B. Zache
*Attorney, Agent, or Firm*—Carl M. Wright

[57] ABSTRACT

Modularized control system arranged to inhibit operation of a controlled machine if an essential module is not installed. A control signal to a necessary operation, such as starting a controlled machine, is routed to a circuit on an essential module which supplies the control signal to its destination only if the essential module is installed and powered.

12 Claims, 6 Drawing Figures

4,387,442

CONTROLLED MACHINE INHIBITION WHEN CONTROL MODULE IS ABSENT

DESCRIPTION

1. Technical Field

This invention relates to control systems and particularly to the selective inhibition of a controlled machine using add-on control modules if an essential module is effectively connected.

When additional features are added to a controlled machine such as an electrophotostatic copier which already includes a programmed microprocessor system for controlling its operation, the add-on memory modules with the control program for the feature being added must be interfaced with the main program. Before the feature is operated, the control code is usually verified to insure that it is present and operable.

Some added features are essential to the basic operation of the machine. To start the machine and then check the operability of an essential feature could damage the machine in the event that the control module for the essential feature is not installed or is not powered.

2. Background Art

The invention described and claimed herein is applicable to programmed controllers having modularized units. Controllers can be modularized for any of several reasons: A single module may not be sufficiently large to contain all the components of the control system or a later-designed circuit (or program) is to be added.

The use of microprocessor-based controllers is widespread and is becoming more popular. The reason for the increasing popularity of the microprocessor-based system as a controller is readily apparent from a consideration of its advantages, especially when compared to a hardware or unique device logic-based controller.

The latter requires a complicated design, even when aided by a computer, providing a separate state for each different control step. The complexity and difficulty of the design increase exponentially with respect to an increase in the number of states required. To design the most efficient controller is usually not even attempted because of the amount of effort required. The increase in controller efficiency is usually not sufficient to offset the additional design effort required. The final controller requires a large number of logic devices as well as complicated printed circuit boards for its implementation.

Once such a hardwired controller is completed, it normally requires a certain amount of debugging which can use more than half the design time of a large controller. If the design is to be altered or expanded to include an unforeseen requirement or to add new features to the machine being controlled, it is almost impossible to modify the design, requiring instead a completely new design and construction effort.

Clearly, the hardwired approach is expensive in terms of the hardware, time, and resources required to reach the final product.

By contrast, the microprocessor-based system is more easily designed. The design approach requires predominantly a programming effort although a certain amount of hardware design is necessary for the auxiliary gating and driving circuits that interface the components of the controlled system with the microprocessor.

The final system is altered simply by changing or deleting program coding or by using different subroutines. Similarly, the system is readily expanded by adding new coding or new subroutines.

The resulting system is usually small in terms of the number of devices required, being no more than a single microcomputer chip in some instances. The substitution of programming effort for sequential machine design and the small number of required additional devices result in an inexpensive system. It is for these very considerations that the microprocessor was developed.

There are, of course, some disadvantages to the use of microprocessor control systems. The control signal output and input signal processes are necessarily performed serially, although handled in a bit parallel manner. Usually, however, this ad-seriatim process is not too great a disadvantage because the microprocessor operates at a speed many magnitudes greater than that of the controlled machine. In fact, the microprocessor is used only for a small fraction of the total time during which the machine is operating.

The stored program must be custom made if stored in a read-only memory but the cost of such devices is decreasing and the price of large capacity, electrically programmable memory devices has come within the reach of even the hobbyist.

The use of read-only memory devices to store programs present a problem when the program is to be modified by changes, deletions, or additions, especially when the program is large and complicated. The modification of a debugged program is liable to introduce unforeseen problems and can result in complete inoperability of the entire program. Usually when the program is written, for example, as the control program for a machine such as an electrophotostatic copier, all the possible features or future modifications cannot be foreseen and provided for. Large and complex programs are usually written in segments, sometimes called modules, which are catenated into a resulting main program. The main program may use many subroutines which can be stored in varying locations, the main program providing for calling and linking to these subroutines.

To provide a separate call and link for every new program would require a restrictively large number of call and link instructions as well as a plethora or return flag indicators, even if the number of features to be added were known at the time the main program is written. Therefore, the addition of more programming, especially where the memory is predominantly of the read-only type and the amount of writable memory is limited, is a unique problem.

When the program for a feature has been added to the main program, it may be essential to the operation of the machine, such as a security feature, or it may not be necessary to the continued operation of the machine, such as a collator controller. Normally, when a program error is encountered, the machine is halted and an indication displayed to call maintenance personnel. Until the machine is repaired, it cannot be used at all.

If the add-on program has been added to control an essential operational feature of the machine that has been subsequently modified, it may be necessary that the machine not be started unless the module is installed (and powered and operable), the damage resulting from its absence not being avoidable if the module is in fact absent. (The module is also considered to be effectively absent if it is not powered or operable).

Interlocks for memory and I/O devices are shown in U.S. Pat. No. 4,200,916. These are provided for parity checking to maintain continuity of the various modules.

(See column 15, lines 60 et seq., op. cit.) As such, they do not perform the function of the invention to be herein described.

Another reference, "Parity Check Circuit for Detecting Missing Feature Cards," by L. C. Eggebrecht and F. Wang, *IBM Technical Disclosure Bulletin,* Vol. 22, No. 10, March 1980, pp. 4366–4368, shows functional logic for performing a sequence that senses whether a feature is installed. As in the other prior art, however, this check is performed during program execution and makes no provision for inhibiting the start of a controlled machine if the feature is missing.

The invention to be described and illustrated prevents the controlled machine from being started if an essential control module is effectively absent.

DISCLOSURE OF THE INVENTION

A machine having electrically-controlled components is controlled by a system having essential parts or modules mounted on pluggable or removable means. The control system also has output means for supplying control signals to the machine, one of which supplies a starting signal to a starting means for initiating machine operation. The starting signal is decoupled (interrupted) if the essential module is absent.

A sensing means mounted on the essential module can be provided to "pass through" a signal to the starting means when the sensing means detects a starting signal. If there is no power to the essential module, the sensing means is disabled.

An advantage of the invention is that without the essential module, the machine cannot be started. The control portion missing may, for example, be the section of the controller that provides for stopping the machine in emergencies. In such a case, if the machine is allowed to start before the determination is made whether the essential feature is present and operable, the machine could be damaged. This situation is avoided by the invention.

DESCRIPTION OF THE PREFERRED EMBODIMENT

Figure 1:
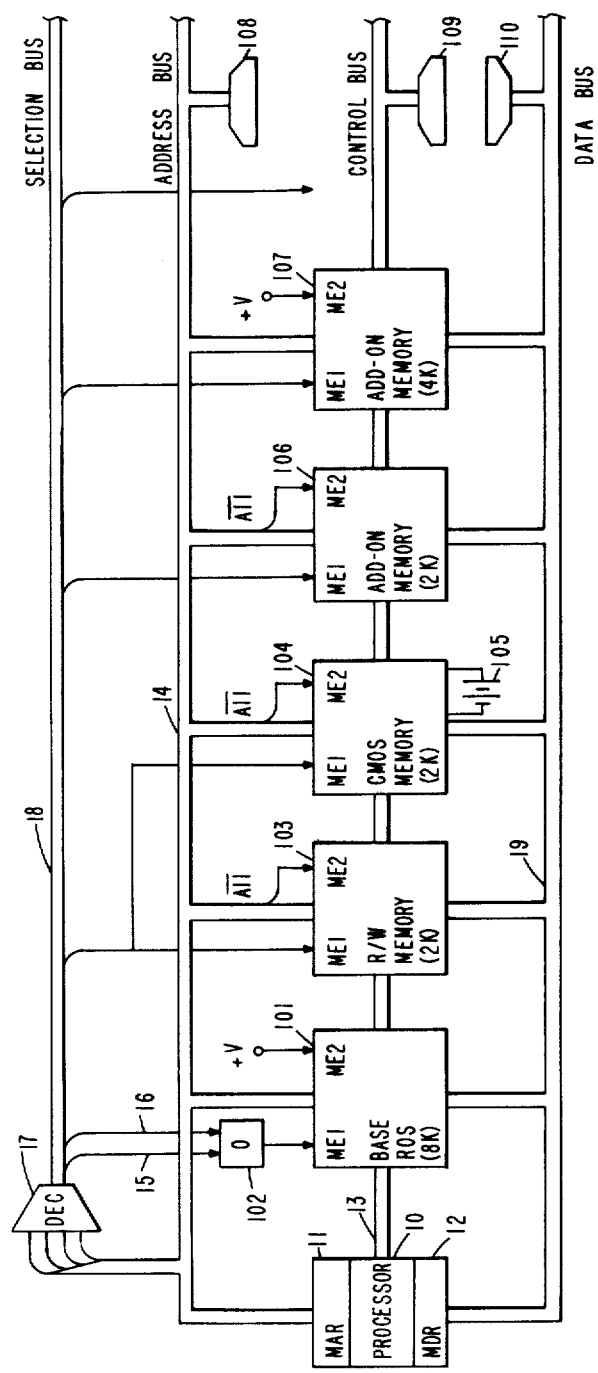
FIG. 1 is a block diagram of an expandable control memory system in which the invention would be useful.

In FIG. 1, a system is shown in which the invention can be used. A processor 10 has a memory address register 11 and a memory data register 12. The memory address register furnishes a number of bits to an address bus 14, consisting typically of sixteen bits or lines, viz., 2'0 to 2'15. (Exponentiation is herein denoted by an apostrophe, '.) In the system of FIG. 1, the four-most significant bits, 2'12 to 2'15, are coupled to a decoder 17 whose output is a selection bus 18 comprising sixteen lines. Only one of the lines on the selection bus can be active at a given time due to the action of the decoder 17, which is well known in the art.

The remaining twelve address bits are coupled to individual memory arrays in parallel.

A data bus 19, typically eight lines, is coupled to the memory data register 12 of the processor. The data bus 19 is coupled in parallel to each of the memory arrays for reading data or for supplying data to be written into the writable memories. A control bus 13 is also provided which transmits to each of the memory arrays signals such as Read/Write, timing, and the like. The control bus 13 is also coupled to each memory array in parallel.

The twelve least significant bits of the address bus are capable of selecting one out of 4,096 memory locations. (Hereinafter, the letter K will be used to represent 1,024 vice 1,000 so that 4,096 is written 4K.)

A base Read Only Storage 101 is shown as having 8K locations. Therefore, two select lines 15 and 16 are coupled to an OR gate 102 which furnishes a memory enable signal. Each memory array is shown as having two memory enable input terminals. In the system being described, both Memory Enable 1 (ME1) and 2 (ME2) must receive a high signal for the associated memory to be enabled. (Many commercially available memory arrays are constructed so that one enabling input must be high and the other enabling input must be low for the memory array to be enabled.) The second memory enable terminal, ME2, of memory array 101 is coupled to a high voltage since it is not required for selection of the memory. Each line of the selection bus 18 selects a particular 4K address group depending on the four-most significant digits of the sixteen-bit address. Therefore, to enable to 8K memory, two 4K selection lines are required although only one at a time is active.

A memory array 103 is shown as a Read/Write memory having 2K storage locations. Because only eleven lines are required to select one of the 2K memory locations, only the 2'0 through 2'10 address lines are coupled to the address inputs of the array 103. To select the memory array 103, its ME2 terminal is coupled to the 2'11 (A11) address inverted bus line. (It is assumed that both the true and the inverted signals are available from the address bus.)

A second 2K memory array 104, shown as a CMOS nonvolatile memory (being powered by battery 105 in case of power loss), is coupled to the same line from the selection bus 18 as the memory array 103. The terminal ME2 of the memory array 104, however, is coupled to the 2'11 (A11) address normal line instead of the inverted line. As a result, the 4K represented by both the memory array 103 and the memory array 104 are selected by a particular selection line from the selection bus 18 but the individual array is selected by the state of the 2'11 (A11) bit of the address.

An Add-On memory array 106 having a capacity of 2K storage locations is shown as coupled to a fourth line from the selection bus 18 with its second memory enabling terminal coupled to the 2'11 bit inverted. A second Add-On memory 107 having 4K locations is coupled to a different line from the selection bus 18 with its second enabling terminal coupled to an enabling positive voltage. Because it has a 4K capacity, only the output line from the selection bus 18 is required to select the memory array 107. In the event that a second 2K capacity memory array is added, the same selection line from the bus 18 coupled to the first enabling terminal of the array 106 can be used as the input to the ME1 terminal of the new array and the ME2 terminal would be coupled to the 2'11 normal bit.

Provision is made for coupling additional memory arrays as shown by the plugs 108, 109 and 110 for coupling a new array to the address bus, control bus, and data bus, respectively. A selection line from the selection bus 18 is also provided. It is assumed that additional provisions are made for further Add-On memory arrays.

In the CMOS memory 104, memory space is usually limited so that adding new memory modules must use as little memory as possible. It is also desirable that the addition of new modules require as little extra programming in the main program as possible.

Figure 2:
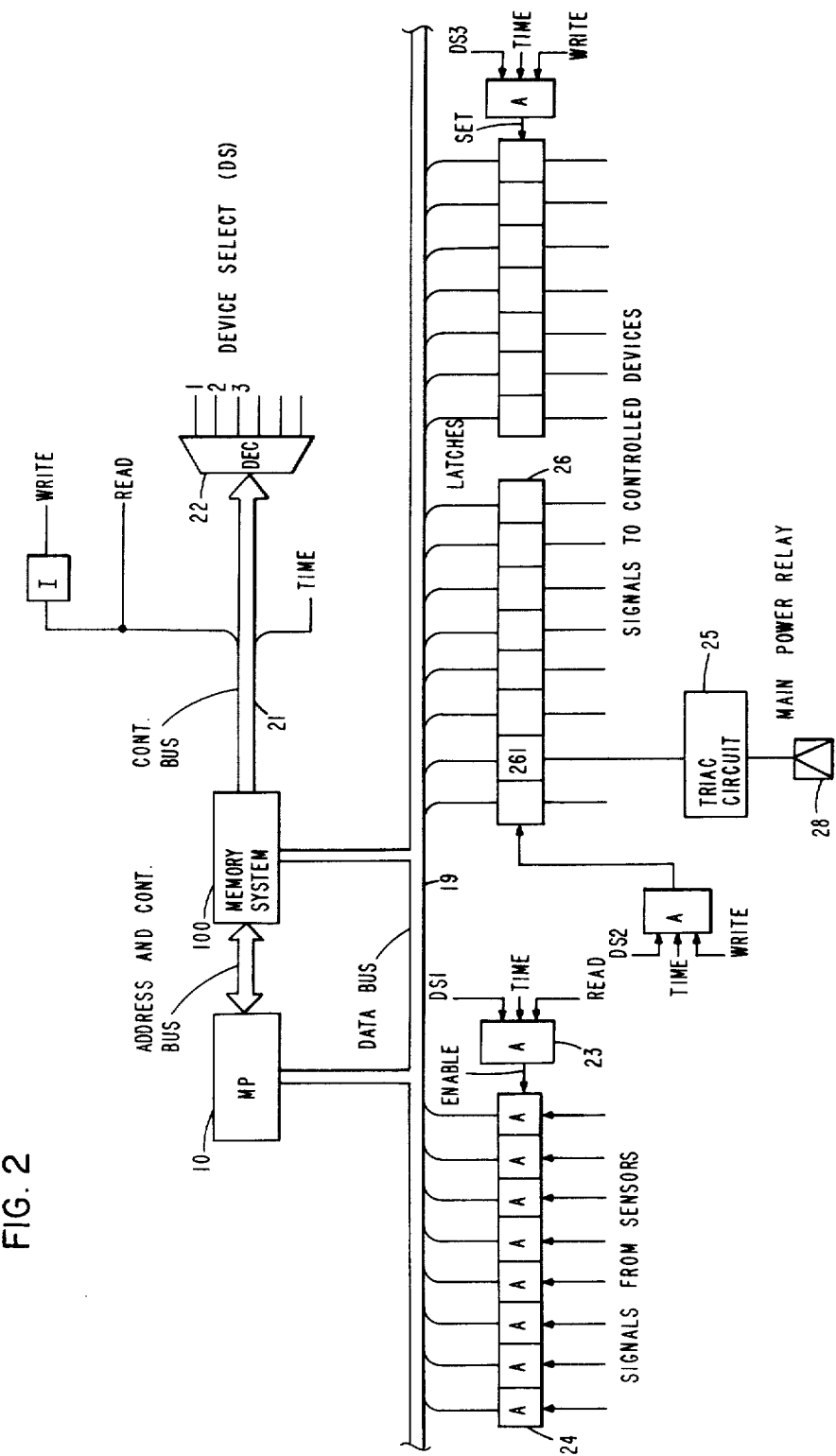
FIG. 2 is a block diagram of microprocessor-based control system.

In FIG. 2, the components of a microprocessor-based controller system are shown in detail. A microprocessor 10 executes programs stored in the memory system 100, providing signals to and accepting signals from the controlled machine via the data bus 19. A control bus 21 from the microprocessor 10 provides read and write signals and device select code signals which are decoded into specific device select lines by a decoder 22. A timing signal, TIME, is also provided to control the transfer of data to and from the data bus at the proper time, i.e., according to the read and write cycles of the processor and memory.

Conditions in the controlled machine are communicated to the microprocessor 10 by signals from machine sensors that are read by the processor via the data bus 19. The microprocessor 10 generates a "read from device 1" instruction which sends a code to the decoder 22 to produce a signal DS1 and supplies a READ signal on the control bus 21. The DS1 and READ signals prime an AND gate 23 which is activated at the proper time by the TIME signal. The active output signal from the AND gate 23 enables a set of AND gates 24 which couple signals from the machine sensors to the data bus 19 at the proper time to be stored in the memory at a predetermined location. By comparing the bits of the eight-bit byte read in by the "read from device 1" instruction, the microprocessor 10 can determine the internal conditions of the machine.

To supply control signals to the controlled machine, the microprocessor 10 executes a "write to device 2" instruction which causes the decoder 22 to output a device select signal DS2 and generates a WRITE signal on the control bus 21. An AND gate 25 is primed by the WRITE and DS2 signals and it is activated by the TIME signal when the output data is valid on the bus. The active output signal from the AND gate 25 sets a group of latches 26 with the data from the bus 19.

A particular latch 261, when set, operates a triac circuit 27 which actuates a main power relay 28. Therefore, setting the latch 261 by setting the corresponding bit in the memory before the WRITE instruction illustrates how the microprocessor controls various machine operation, e.g., turning on the main power relay.

To inhibit the bit in the set latch 261 from operating the triac circuit 27 if an essential part or module of the controller is not installed, the coupling between the latch 261 and the triac circuit 27 is made through the essential module or through a circuit board on which the module is mounted.

The essential module may be a control device or a read-only memory module containing essential programming. It may also be a plurality of control components or devices mounted on a printed circuit board.

The essential module may be pluggable which herein includes any form in which it may be removable, even if mounted with screws and coupled with soldered or wire-wound connections. For descriptive purposes, the essential module will be considered mounted on a carrier which includes a socket which connects to a matching plug.

Figure 3:
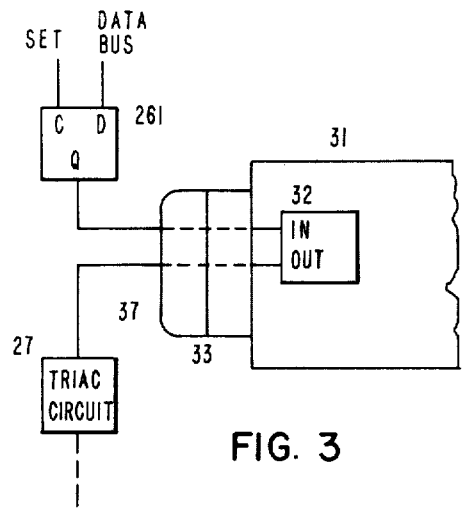
FIG. 3 is a circuit for decoupling a start control line according to the invention.

A coupling from the latch 261 to the triac circuit 27 according to the above is shown in FIG. 3. Included in the circuit is the carrier, a plug-in circuit 31. The plug-in circuit 31 includes a plug 33 which connects to a socket 37. Many connections are made via the socket 37 and plug 33 but only the two of interest are shown. The control line from the latch 261 is coupled to a device 32 on the plug-in circuit 31. The device 32 provides an output signal that activates the triac circuit. The device 32 acts to pass the signal from the latch 261 to the triac circuit 27 when the plug-in circuit 31 is installed.

At its simplest, the device 32 can be merely a jumper connection between the two lines. Thus, if the plug-in circuit 31 is not inserted in its proper socket, the control signal from the latch 261 cannot actuate triac circuit 27 to turn on the main power relay 28.

Figure 4:
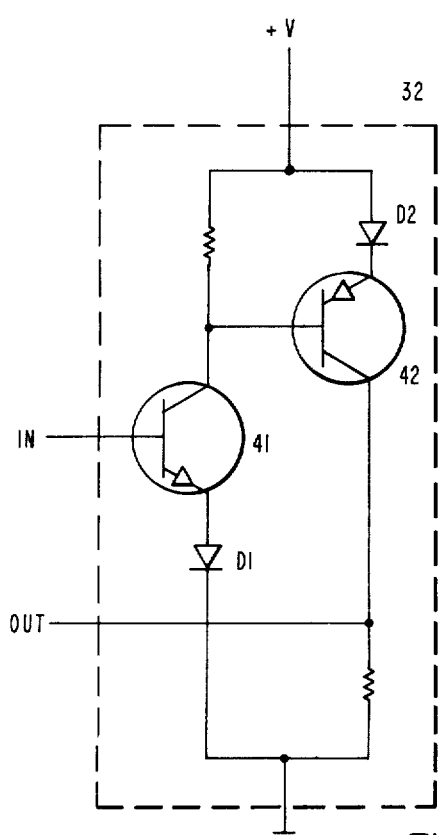
FIG. 4 is a circuit diagram of a sensor and driver suitable for practicing the invention.
Figure 5:
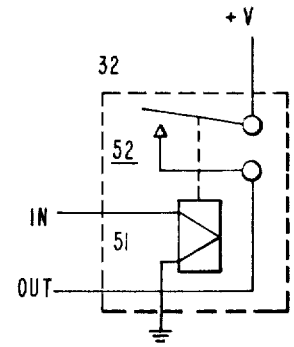
FIG. 5 is an alternate embodiment of a sensor and driver for practicing the invention.

A simple jumper connection, however, has the disadvantage that the triac circuit can be activated by the control signal from the latch 261 if the plug-in circuit 31 is installed but not powered. FIGS. 4 and 5 illustrate alternate embodiments of the device 32 of FIG. 3. These embodiments require that the power be supplied to the plug-in circuit 31 for the triac circuit 27 to be actuated.

The circuit of FIG. 4 has two direct-coupled transistors 41 and 42 which are turned on by the control signal from the latch 261. When the control signal at the IN terminal rises to a value exceeding Vbe plus the diode drop of D1, the transistor 41 conducts and its collector drops to a potential less than +V minus the diode drop across D2 plus Vbc of the transistor 42. This causes the transistor 42 to conduct, raising the potential at the OUT terminal to +V less Vce of the transistor 42 and the diode drop across D2.

The transistors 41 and 42 are powered by the voltage supplied to the plug-in circuit 31 so that if the plug-in circuit 31 has no power, the circuit of FIG. 4 will not produce an output signal to the triac circuit 27.

FIG. 5 shows a relay implementation in which the signal from the latch 261 activates a relay coil 51. When energized, the relay coil 51 closes the contacts 52 which provide a path from the power input to the plug-in circuit 31 to the triac circuit 27. Thus, power must be applied to the plug-in circuit 31 to activate the triac circuit 27.

A circuit for decoupling the start signal from the triac control circuit has been shown and described in the case where a plug-in circuit 31 (FIG. 3) is effectively absent, either by virtue of not being installed or not being powered. The plug-in circuit can be embodied by module, a portion of the control system, or the like. It is clear from the above explanation that the connection from the latch 261 to the triac circuit 27 could be made through several plug-in circuits in the same manner as described for one.

Figure 6:
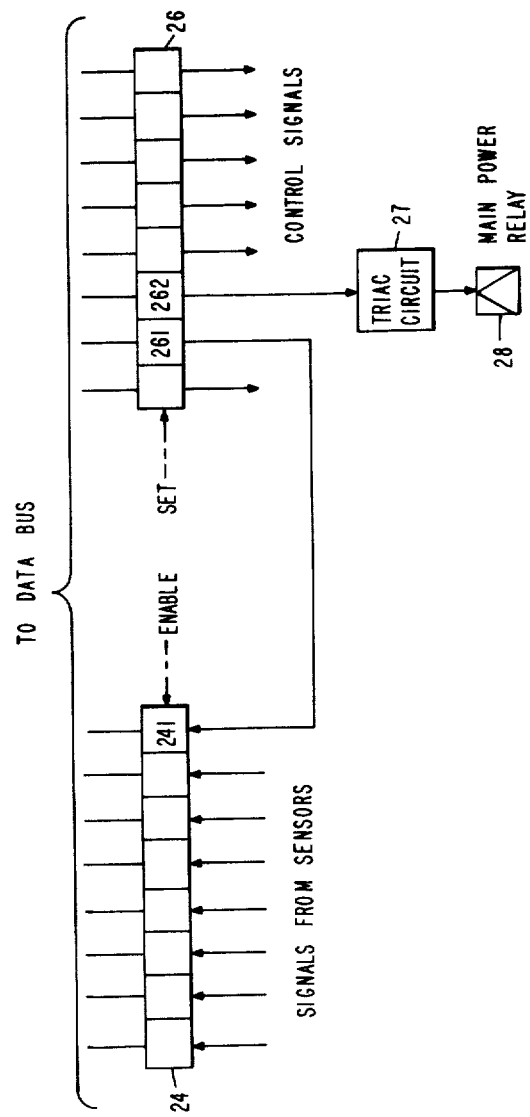
FIG. 6 is a block diagram of the detail of the input/output ports as used by the invention.

In an alternative preferred embodiment of the invention, the interlock loop is completed by software to insure that the add-on module is operational as well as present and powered. In FIG. 6, the output signal from the output latch 261 is rerouted to a previously unused or reserved input port 241 which is one of the input ports of the previously described input AND gate network 24. The triac circuit 27 is activated by an output signal from an unused or reserved output latch 262 in the previously described output latch array 26.

The circuit of the embodiment of FIG. 6 operates in the following manner. The main program executes a write signal that sets the latch 261 to activate the triac circuit 27. The circuit has been modified, however, to the configuration shown in FIG. 6, precluding the activation of the triac circuit 27 and therefore the activation of the main power relay 28.

The main program next transfers control to the add-on module containing an essential feature. The first steps of the add-on program include a read instruction that senses the bit from the input port 241. If the bit is set, the add-on program next executes a write instruction that energizes the latch 262 which, in turn, activates the triac circuit 27 and main power relay 28.

The result is that if the add-on essential feature is not properly installed or powered and operational, the machine will not start. Only if the add-on module is installed in the correct location, is powered, and is operational, i.e., the code is valid, will the machine start.

The main program includes a write instruction to issue the start command (to latch 261) and a call instruction that transfers program control to the add-on module. The called subroutine in the add-on module includes, in the initial part of the code, a read instruction to store the bit from the port 241 in the memory 100 (FIG. 2), a compare instruction to determine the status of the stored bit, a branch instruction to a write instruction if the bit is set, and the write instruction itself which sets the latch 262 to activate the machine. After the above described process is accomplished, the rest of the program for the add-on feature is executed.

This embodiment of the invention has the advantages of not requiring additional hardware on the printed circuit or pluggable add-on module and not requiring any change to the main program. The connection of the triac circuit 27 is changed to a previously unused output latch and the previous triac control latch is wired to a previously unused input port. The add-on program is then designed to sense the proper input port and to activate the proper output port. A further advantage of this embodiment is that several additional add-on modules can be connected in the same way. Most machines are usually with several unused input ports and unused output latches. In the design of the controlled machine, any number of ports or output latches can be reserved for the purpose of subsequently adding such modules.

Various modifications to the systems and circuits described and illustrated to explain the concepts and modes of practicing the invention can be made by those of ordinary skill in the art within the principles or scope of the invention as expressed in the following claims.

What is claimed is:

1. In a programmable control system having an expandable memory system for adding memory modules containing control programs to operate given features of a controlled machine, at least one of said given features being essential for proper machine operation, said control system including output means for supplying control signals to said machine, and add-on memory module means for storing a program to control an essential feature, the improvement comprising:
   means for coupling a given control signal from said output means to said add-on memory module means, said given control signal being used to start machine operation; and
   means in said add-on memory module means for supplying a control signal to start machine operation if said given control signal is supplied.

2. The invention as claimed in claim 1 wherein said supplying means comprises jumper circuit means for conducting said given control signal to supply the control signal to start machine operation.

3. The invention as claimed in claim 1 including means in said add-on memory module means for sensing said given control signal and wherein said supplying means supplies a control signal to start machine operation in response to said given control signal being sensed.

4. The invention as claimed in claim 3 including power supply means for supplying operating power to said add-on memory module means and said sensing means is operated by said power supply means.

5. A method for starting operation of a controlled machine, where the control signals supplied by a controller to the controlled machine include a starting signal to start said machine to insure that an essential module of said controller is installed and powered, comprising the steps of:
   coupling the starting signal to said essential module; and
   conducting said starting signal to its destination through said essential module only if said essential module is powered.

6. The invention as claimed in claim 5 including the steps of:
   sensing the starting signal by means mounted on and powered by said essential module; and
   said conducting step is performed in response to said sensing step.

7. In a programmable control system having a main control program and provision for adding memory modules containing additional control programs to operate a controlled machine, said control system including a plurality of output means for supplying control signals to said controlled machine, a plurality of input means for receiving signals, activation means for enabling said controlled machine to be operated, said activation means being coupled to a particular one of said plurality of output means, and add-on memory module means for storing an additional control program, the improvement comprising:
   means for supplying a signal in response to said main control program to a certain one of said plurality of output means, said signal being indicative of activating said activation means;
   means for coupling said certain one of said plurality of output means to a certain one of said plurality of input means;
   means responsive to said additional control program for sensing said certain one of said plurality of input means; and
   means responsive to said additional control program and the value of said sensed certain one of said plurality of input means for supplying an activation signal to said activation means via said particular one of said output means.

8. A method for activating an external device by a system under the control of first and second programs, said system including a plurality of output means for supplying signals and a plurality of input means for receiving signals, comprising the steps of:
   supplying a first activating signal to a first one of said output means in response to said first program;
   coupling said first one of said output means to one of said input means;

sensing said first activating signal at said one of said input means in response to said second program;

supplying a second activation signal to a second one of said output means in response to sensing said first activation signal; and conducting said second activation signal to said external device.

9. In a programmed controller means for generating control signals to control a controlled device, at least one of said control signals being necessary to the operation of the controlled device, the controller means including output means for supplying said control signals from said controller means and for coupling at least some of said control signals to said controlled device, and input means for coupling input signals to said controller means, the improvement comprising:

means for coupling at least one of said necessary control signals from said output means to said input means and not to said controlled device;

add-on means, removably attachable to and forming part of said controller means, for supplying essential control signals to said controlled device; and means, in said add-on means, for sensing the presence of at least one of said necessary control signals at said input means and for supplying said sensed necessary control signal to said output means to be coupled to said controlled device.

10. The invention as claimed in claim 9 where said at least one necessary control signal includes starting signal means for causing said controlled device to start.

11. A method, in a system for controlling a controlled device, for coupling a necessary control signal to said controlled device only if a subroutine, essential to the control of said controlled device, is available, comprising the steps of:

causing a signal, representative of a necessary control signal, to be coupled to set an output latching means;

coupling said output latching means to an input means; and calling an essential subroutine which includes the steps of:

sensing said input means to determine whether said output latching means is set, and supplying said necessary signal to said controlled device only if said output latching means is set.

12. The invention claimed in claim 11 wherein said necessary signal is a start signal.

* * * * *